United States Patent
Sato et al.

(10) Patent No.: US 9,236,769 B2
(45) Date of Patent: Jan. 12, 2016

(54) CONTROL DEVICE

(75) Inventors: Eduardo Kazuhide Sato, Minato-ku (JP); Masahiro Kinoshita, Minato-ku (JP); Yushin Yamamoto, Minato-ku (JP); Tatsuaki Amboh, Minato-ku (JP); Katsumi Ikeda, Chiyoda-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 976 days.

(21) Appl. No.: 13/395,248

(22) PCT Filed: Sep. 11, 2009

(86) PCT No.: PCT/JP2009/065934
§ 371 (c)(1),
(2), (4) Date: Apr. 24, 2012

(87) PCT Pub. No.: WO2011/030447
PCT Pub. Date: Mar. 17, 2011

(65) Prior Publication Data
US 2012/0200171 A1    Aug. 9, 2012

(51) Int. Cl.
*H02J 9/00* (2006.01)
*H02J 9/06* (2006.01)
*H02M 5/458* (2006.01)

(52) U.S. Cl.
CPC ............. *H02J 9/062* (2013.01); *H02M 5/4585* (2013.01); *Y10T 307/747* (2015.04)

(58) Field of Classification Search
USPC .......................................................... 307/64
See application file for complete search history.

(56) References Cited

U.S. PATENT DOCUMENTS

| 4,783,728 A | 11/1988 | Hoffman |
| 2006/0086981 A1 | 4/2006 | Yamaguchi et al. |
| 2007/0216228 A1* | 9/2007 | Johnson et al. ................. 307/64 |

FOREIGN PATENT DOCUMENTS

| CN | 101505089 A | 8/2009 |
| EP | 0 244 186 A2 | 11/1987 |
| JP | 62 268366 | 11/1987 |
| JP | 7 298516 | 11/1995 |
| JP | 2002 119068 | 4/2002 |
| JP | 2006 121834 | 5/2006 |

OTHER PUBLICATIONS

Combined Office Action and Search Report issued Oct. 8, 2013 in Chinese Patent Application No. 200980161437.0 (with English translation and English translation of Category of Cited Documents).

(Continued)

*Primary Examiner* — Rexford Barnie
*Assistant Examiner* — Dru Parries
(74) *Attorney, Agent, or Firm* — Oblon, McClelland, Maier & Neustadt, L.L.P.

(57) ABSTRACT

A control unit of an uninterruptible power supply device includes a PWM circuit generating a plurality of PWM signals controlling a plurality of IGBT elements of a power conversion unit; a plurality of output terminals for supplying the plurality of PWM signals to the plurality of IGBTs; and a switching circuit arranging the plurality of PWM signals in order in accordance with the type of the uninterruptible power supply device and supplying the PWM signals to the plurality of output terminals. Accordingly, the control unit can be shared among a plurality of types of uninterruptible power supply devices.

2 Claims, 7 Drawing Sheets

(56) References Cited

OTHER PUBLICATIONS

International Search Report issued on Dec. 8, 2009 in PCT/JP09/065934 filed on Sep. 11, 2009.
U.S. Appl. No. 13/498,009, filed Mar. 23, 2012, Sato, et al.
U.S. Appl. No. 13/498,515, filed Mar. 27, 2012, Sato, et al.
Office Action issued May 8, 2013 in Korean Patent Application No. 10-2012-7007861 (with English language translation).
H. Krishnaswami, et al., "A Current-fed Three-port Bi-directional DC-DC Converter", IEEE, 2007, pp. 523-526 (English).

* cited by examiner

CONTROL DEVICE

TECHNICAL FIELD

The present invention relates to a control device, and particularly to a control device controlling a plurality of switching elements in a power conversion device.

BACKGROUND ART

Conventionally, an uninterruptible power supply device is widely used as a power supply device for stably supplying alternating-current (AC) power to an essential load such as a computer system. For example, as disclosed in Japanese Patent Laying-Open No. 07-298516 (Patent Literature 1), the uninterruptible power supply device generally includes a converter converting commercial AC power into direct-current (DC) power, an inverter converting the DC power into AC power and supplying the AC power to a load, a chopper supplying the DC power generated by the converter to a battery at the time of receiving the commercial AC power and supplying the DC power of the battery to the inverter at the time of interruption of the commercial AC power, and a control unit controlling the entire device.

CITATION LIST

Patent Literature

PTL 1: Japanese Patent Laying-Open No. 07-298516

SUMMARY OF INVENTION

Technical Problem

In such an uninterruptible power supply device, a converter, an inverter and a chopper each consist of a plurality of power modules. Each power module includes a plurality of IGBT elements connected in series and a diode connected in anti-parallel to each IGBT element. The control unit also includes a signal generation circuit generating a plurality of control signals for controlling the plurality of IGBT elements, and output terminals for outputting the plurality of control signals.

The number of power modules varies depending on the type of the uninterruptible power supply device. For example, in the case of the type of the device having relatively large rated power, a plurality of power modules are connected in parallel and these power modules are greater in number than the type of the device having a relatively small rated power. The layout of the plurality of power modules is changed for each type of the device in order to minimize the size of the device.

Furthermore, since the plurality of power modules connected in parallel are controlled by the same control signal, the signal generation circuit is used in common among the plurality of types of uninterruptible power supply devices. However, when the layout of the power modules is changed, it becomes necessary also to change the layout of the output terminals in consideration of the path and the like of the wiring for connecting each power module and the output terminals of the control unit. Accordingly, the control unit conventionally needs to be changed for each type of the device, which causes a problem that the cost is increased.

Therefore, a main purpose of the present invention is to provide a control device that allows cost reduction for a power conversion device.

Solution To Problem

A control device according to the present invention is a control device in a power conversion device including a plurality of switching elements, this control device controlling the plurality of switching elements. A layout of the plurality of switching elements is different for each type of the power conversion device. The control device includes a signal generation circuit generating a plurality of control signals controlling the plurality of switching elements; a plurality of output terminals for supplying the plurality of control signals to the plurality of switching elements; and a switching circuit arranging the plurality of control signals in order in accordance with the type of the power conversion device and supplying the plurality of control signals to the plurality of output terminals.

Preferably, the plurality of output terminals are grouped by a predetermined number of output terminals into a plurality of first groups. The plurality of switching elements are grouped by a predetermined number of switching elements into a plurality of second groups. The control device further includes a drive circuit provided corresponding to each of the second groups and driving each of the switching elements in a corresponding one of the second groups; and a multicore cable connecting the predetermined number of output terminals belonging to each of the first groups and the corresponding drive circuit.

Further preferably, the power conversion device is an uninterruptible power supply device.

Advantageous Effects Of Invention

In the control device according to the present invention, since a plurality of control signals generated by a signal generation circuit are arranged in order in accordance with the type of the power conversion device and supplied to a plurality of output terminals, the control device can be shared among a plurality of types of power conversion devices. Therefore, the power conversion device can be reduced in cost.

DESCRIPTION OF EMBODIMENTS

Figure 1:
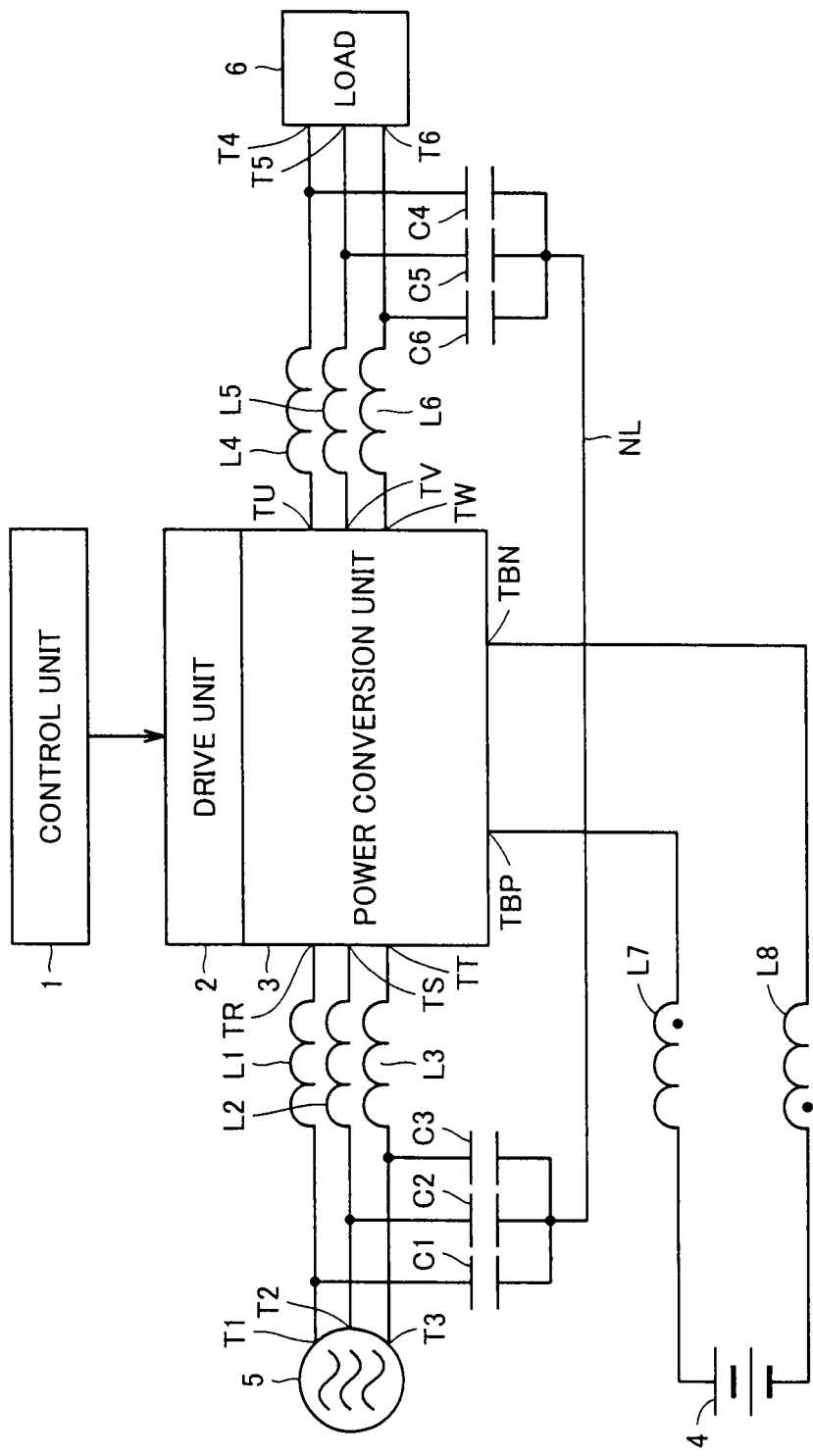
FIG. 1 is a circuit block diagram showing the entire configuration of an uninterruptible power supply device according to one embodiment of the present invention.

As shown in FIG. 1, an uninterruptible power supply device of the present application includes capacitors C1 to C6, reactors L1 to L8, a control unit 1, a drive unit 2, a power conversion unit 3, and a battery 4. Control unit 1 detects an input voltage and an output voltage of power conversion unit 3, a voltage across the terminals of battery 4, and the like. Based on the detected results, control unit 1 generates a PWM (Pulse Width Modulation) signal for controlling power conversion unit 3. Drive unit 2 drives power conversion unit 3 in accordance with the PWM signal generated by control unit 1.

At the time of the normal operation in which a commercial AC power supply 5 supplies AC power, power conversion unit 3 converts the AC power into DC power. Then, while charging battery 4 with the DC power, power conversion unit 3 converts the DC power into AC power of a commercial frequency and supplies the AC power to a load 6. Furthermore, at the time of the interruption in which commercial AC power supply 5 stops supplying the AC power, power conversion unit 3 converts the DC power stored in battery 4 into AC power of a commercial frequency and supplies the AC power to load 6. Therefore, according to this uninterruptible power supply device, even when an interruption occurs, the operation of load 6 can be continued until the DC power of battery 4 is consumed.

Capacitors C1 to C3 each have one electrode connected to an R-phase terminal T1, an S-phase terminal T2 and a T-phase terminal T3, respectively, of commercial AC power supply 5, and also have the other electrode connected to a virtual neutral line NL. Reactors L1 to L3 each have one terminal connected to R-phase terminal T1, S-phase terminal T2 and T-phase terminal T3, respectively, of commercial AC power supply 5, and also have the other terminal connected to an R-phase terminal TR, an S-phase terminal TS and a T-phase terminal TT, respectively, of power conversion unit 3.

Capacitors C1 to C3 and reactors L1 to L3 constitute an input filter (low pass filter) that passes the signal of a commercial frequency (for example, 60 Hz) and interrupts the signal of a carrier frequency (for example, 10 kHz) generated in power conversion unit 3. The AC voltage is transmitted from commercial AC power supply 5 through the input filter to power conversion unit 3 while the signal of a carrier frequency generated in power conversion unit 3 is interrupted by the input filter. Therefore, the signal of a carrier frequency generated in power conversion unit 3 is prevented from causing an adverse effect on commercial AC power supply 5.

Reactors L4 to L6 each have one terminal connected to a U-phase terminal TU, a V-phase terminal TV and a W-phase terminal TW, respectively, of power conversion unit 3, and also have the other terminal connected to a U-phase terminal T4, a V-phase terminal T5 and a W-phase terminal T6, respectively, of load 6. Capacitors C4 to C6 each have one electrode connected to U-phase terminal T4, V-phase terminal T5 and W-phase terminal T6, respectively, of load 6, and also have the other electrode connected to virtual neutral line NL.

Reactors L4 to L6 and capacitors C4 to C6 constitute an output filter (low pass filter) that passes the signal of a commercial frequency and interrupts the signal of a carrier frequency generated in power conversion unit 3. The AC voltage is transmitted from power conversion unit 3 through the output filter to load 6 while the signal of a carrier frequency generated in power conversion unit 3 is interrupted in the output filter. Therefore, the signal of a carrier frequency generated in power conversion unit 3 is prevented from causing an adverse effect on load 6.

Reactors L7 and L8 each have one terminal connected to battery terminals TBP and TBN, respectively, of power conversion unit 3, and also have the other terminal connected to a positive electrode and a negative electrode, respectively, of battery 4. Reactors L7 and L8 constitute a normal mode reactor to suppress generation of noise.

Figure 2:
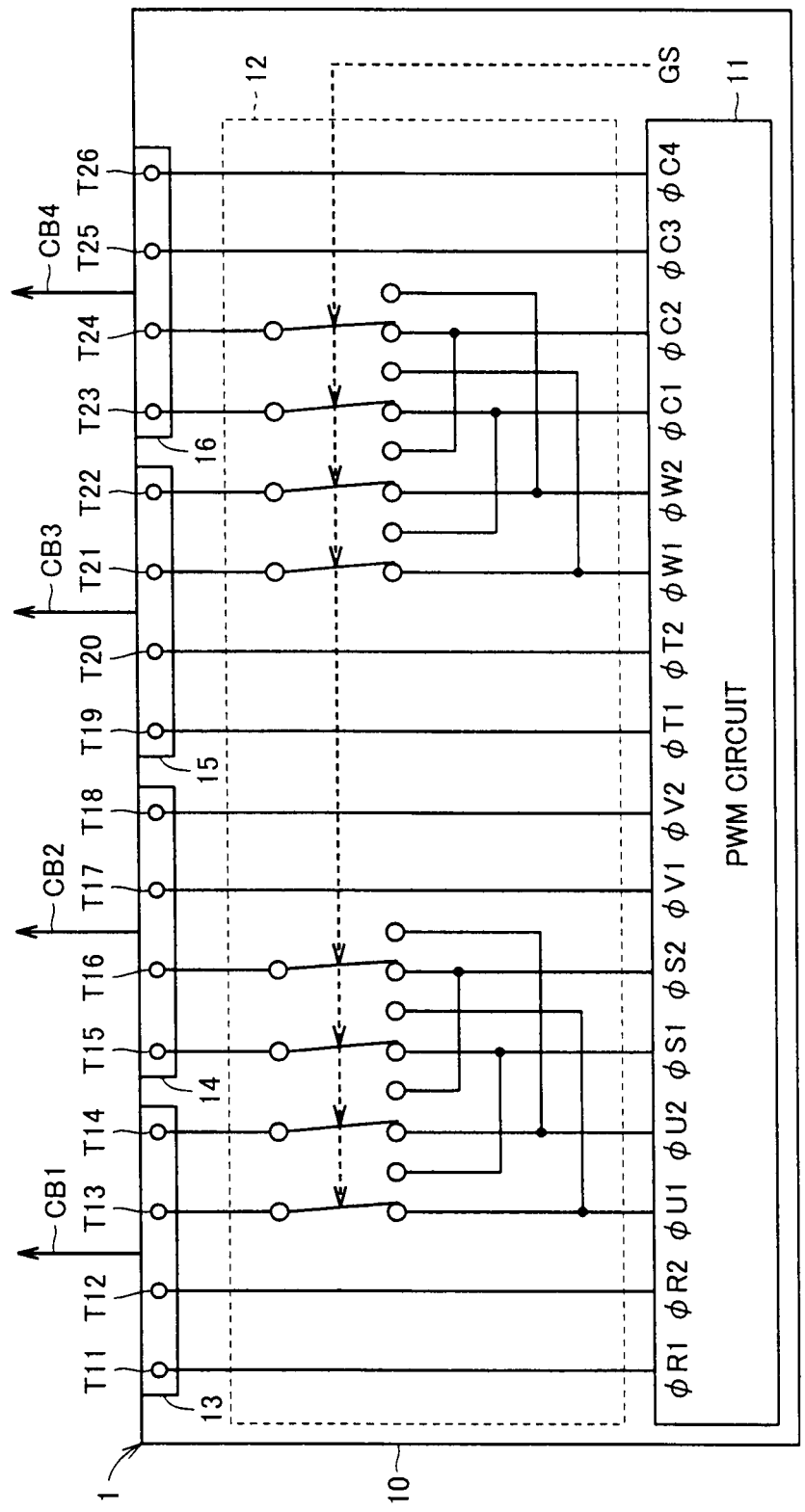
FIG. 2 is a circuit block diagram showing the configuration and the operation of a control unit in the case where the uninterruptible power supply device shown in FIG. 1 is of the first type.

FIG. 2 is a circuit block diagram showing the configuration of control unit 1. In FIG. 2, control unit 1 includes a substrate 10, a PWM circuit 11 mounted on substrate 10, a switching circuit 12, and four output ports 13 to 16. PWM circuit 11 generates PWM signals ΦR1, ΦR2, ΦU1, ΦU2, ΦS1, ΦS2, ΦV1, ΦV2, ΦT1, ΦT2, ΦW1, ΦW2, and ΦC1 to ΦC4 for controlling power conversion unit 3. Output port 13 includes output terminals T11 to T14, output port 14 includes output terminals T15 to T18, output port 15 includes output terminals T19 to T22, and output port 16 includes output terminals T23 to T26.

Figure 3:
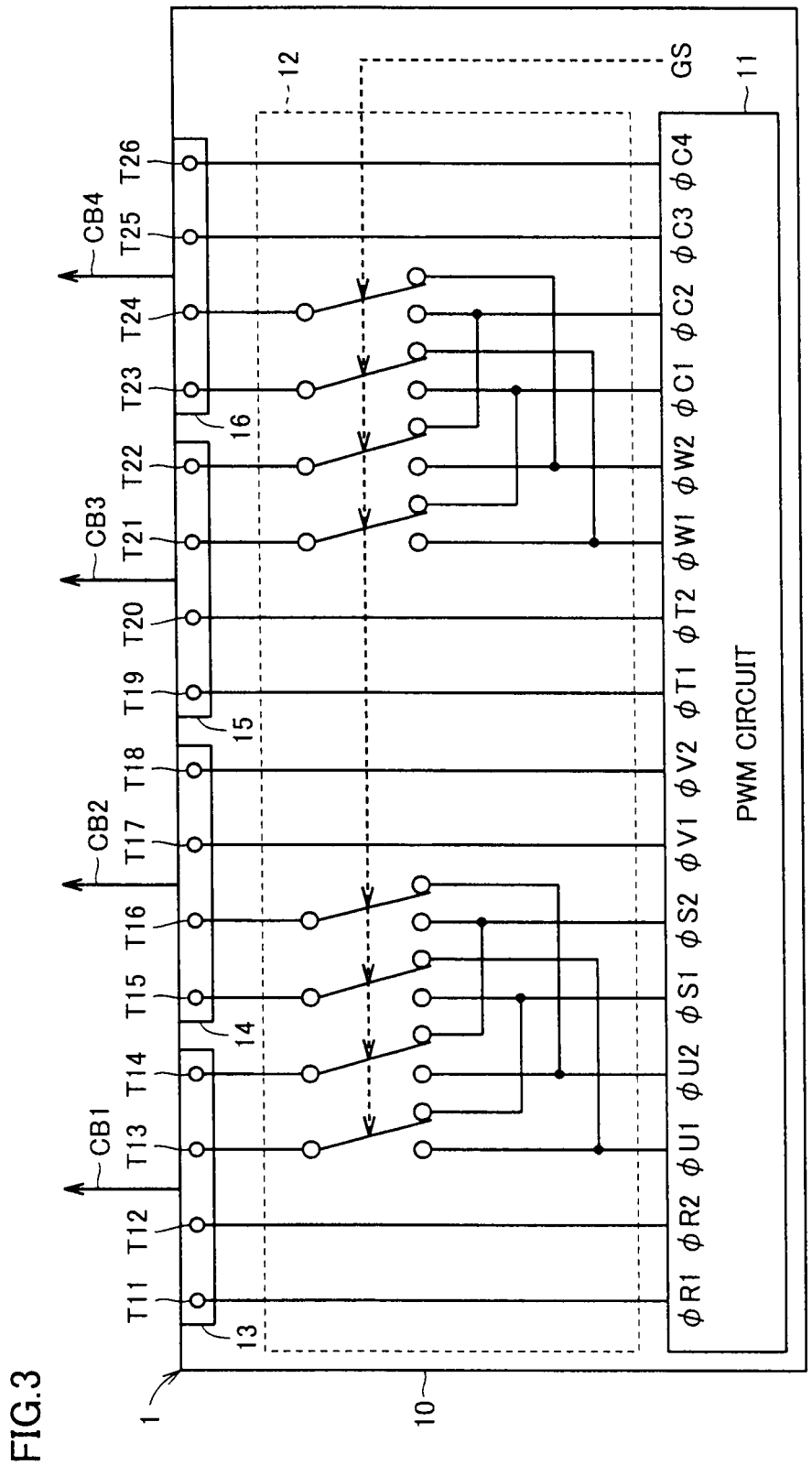
FIG. 3 is a circuit block diagram showing the configuration and the operation of the control unit in the case where the uninterruptible power supply device shown in FIG. 1 is of the second type.

When a gate selection signal GS is brought into an "L" level, switching circuit 12 supplies PWM signals ΦR1, ΦR2, ΦU1, ΦU2, ΦS1, ΦS2, ΦV1, ΦV2, ΦT1, ΦT2, ΦW1, ΦW2, and ΦC1 to ΦC4 to output terminals T11 to T26, respectively, as shown in FIG. 2. Furthermore, when gate selection signal GS is brought into an "H" level, switching circuit 12 supplies PWM signals ΦR1, ΦR2, ΦS1, ΦS2, ΦU1, ΦU2, ΦV1, ΦV2, ΦT1, ΦT2, ΦC1, ΦC2, ΦW1, ΦW2, ΦC3, and ΦC4 to output terminals T11 to T26, respectively, as shown in FIG. 3.

Gate selection signal GS is brought into an "L" level when the uninterruptible power supply device is of the first type, and is brought into an "H" level when the uninterruptible power supply device is of the second type. The rated power of the first type is, for example, 100 kVA while the rated power of the second type is, for example, 225 kVA. Output ports 13 to 16 are connected to drive unit 2 via four-core cables CB1 to CB4, respectively.

Figure 4:
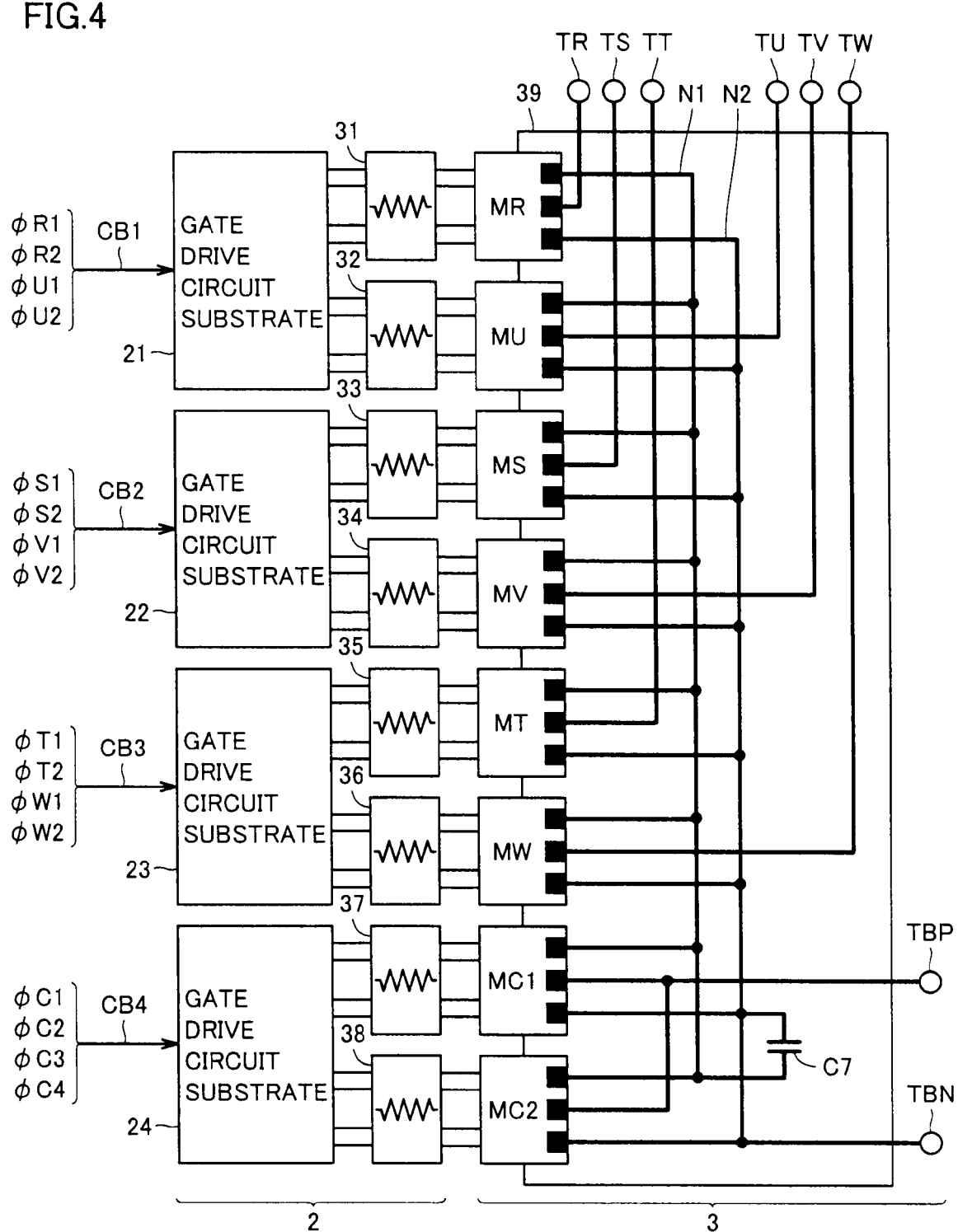
FIG. 4 is a circuit block diagram showing the configuration of a drive unit and a power conversion unit in the case where the uninterruptible power supply device shown in FIG. 1 is of the first type.

FIG. 4 is a block diagram showing the configuration and the layout of drive unit 2 and power conversion unit 3 in the case where the uninterruptible power supply device is of the first type. In FIG. 4, drive circuit 2 includes four gate drive circuit substrates 21 to 24 and eight gate resistors 31 to 38 while power conversion unit 3 includes a wiring board 39 of a rectangular shape, eight power modules MR, MU, MS, MV, MT, MW, MC1 and MC2, and a capacitor C7.

Gate drive circuit substrates 21 to 24 are arranged in one row vertically as seen in FIG. 4, and connected to their respective output ports 13 to 16 in FIG. 2 via four-core cables CB1 to CB4, respectively. PWM signals ΦR1, ΦR2, ΦU1, and ΦU2 are supplied from PWM circuit 11 via four-core cable CB1 to gate drive circuit substrate 21. PWM signals ΦS1, ΦS2, ΦV1, and ΦV2 are supplied from PWM circuit 11 via four-core cable CB2 to gate drive circuit substrate 22. PWM signals ΦT1, ΦT2, ΦW1, and ΦW2 are supplied from PWM circuit 11 via four-core cable CB3 to gate drive circuit substrate 23. PWM signals ΦC1 to ΦC4 are supplied from PWM circuit 11 via four-core cable CB4 to gate drive circuit substrate 24.

Gate resistors 31 to 38 are arranged in one row adjacent to gate drive circuit substrates 21 to 24. Power modules MR, MU, MS, MV, MT, MW, MC1, and MC2 are arranged adjacent to gate resistors 31 to 38, respectively, in one row along one of the long sides of wiring board 39 and fixed to wiring board 39.

Each of power modules MR, MU, MS, MV, MT, MW, MC1, and MC2 has the first to third output terminals. The first output terminal of each of power modules MR, MU, MS, MV, MT, MW, MC1, and MC2 is connected to a positive voltage node N1. The second output terminals of power modules MR, MU, MS, MV, MT, and MW are connected to R-phase terminal TR, U-phase terminal TU, S-phase terminal TS, V-phase terminal TV, T-phase terminal TT, and W-phase terminal TW, respectively. The second output terminal of each of power modules MC1 and MC2 is connected to battery terminal TBP. The third output terminal of each of power modules MR, MU, MS, MV, MT, MW, MC1, and MC2 is connected to a negative voltage node N2 and battery terminal TBN. Capacitor C7 is connected between nodes N1 and N2.

Gate drive circuit substrate 21 drives power module MR via gate resistor 31 in accordance with PWM signals φR1 and φR2, and also drives power module MU via gate resistor 32 in accordance with PWM signals φU1 and φU2. Gate drive circuit substrate 22 drives power module MS via gate resistor 33 in accordance with PWM signals φS1 and φS2, and also drives power module MV via gate resistor 34 in accordance with PWM signals φV1 and φV2.

Gate drive circuit substrate 23 drives power module MT via gate resistor 35 in accordance with PWM signals ΦT1 and ΦT2, and also drives power module MW via gate resistor 36 in accordance with PWM signals ΦW1 and ΦW2. Gate drive circuit substrate 24 drives power module MC1 via gate resistor 37 in accordance with PWM signals ΦC1 and ΦC2, and also drives power module MC2 via gate resistor 38 in accordance with PWM signals ΦC3 and ΦC4.

Figure 5:
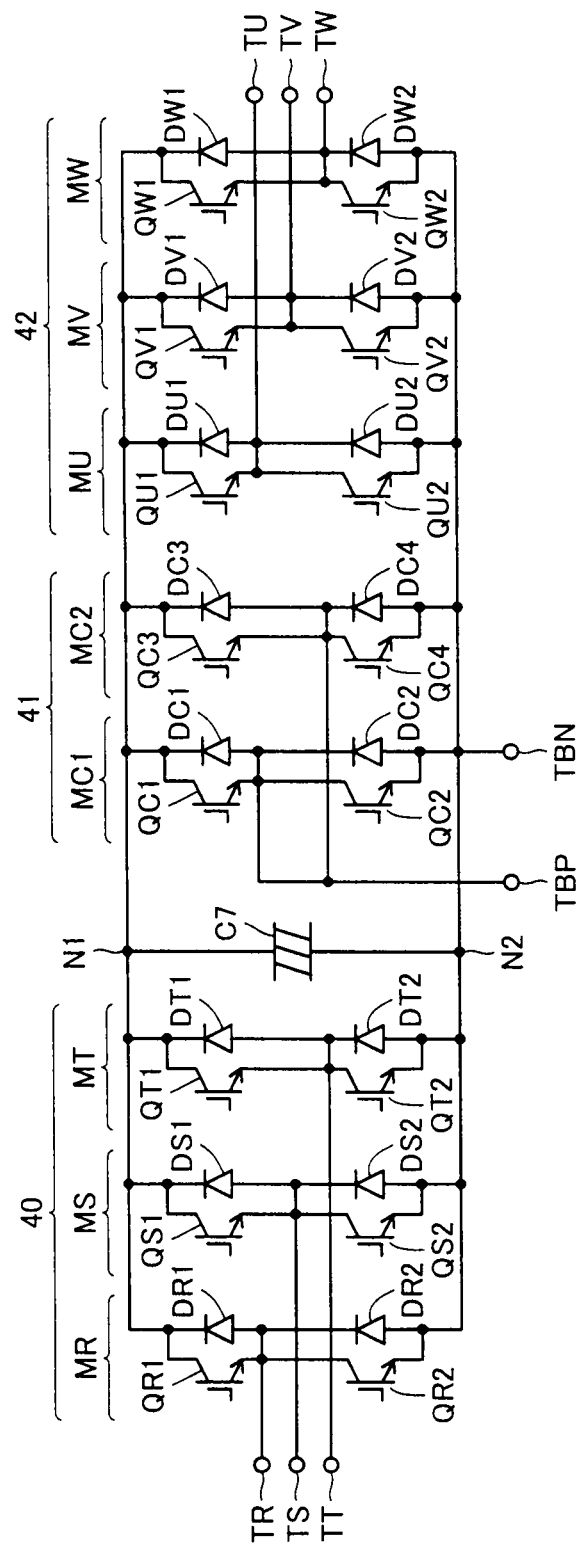
FIG. 5 is a circuit diagram showing the configuration of the power conversion unit shown in FIG. 4.

FIG. 5 is a circuit diagram showing the configuration of power conversion unit 3. In FIG. 5, power modules MR, MS and MT constitute a converter 40. Power module MR includes two IGBT elements QR1 and QR2 connected in series between positive voltage node N1 and negative voltage node N2, and two diodes DR1 and DR2 connected in anti-parallel to IGBT elements QR1 and QR2, respectively. The node between IGTB elements QR1 and QR2 is connected to R-phase terminal TR.

Power module MS includes two IGBT elements QS1 and QS2 connected in series between positive voltage node N1 and negative voltage node N2, and two diodes DS1 and DS2 connected in anti-parallel to IGBT elements QS1 and QS2, respectively. The node between IGTB elements QS1 and QS2 is connected to S-phase terminal TS.

Power module MT includes two IGBT elements QT1 and QT2 connected in series between positive voltage node N1 and negative voltage node N2, and two diodes DT1 and DT2 connected in anti-parallel to IGBT elements QT1 and QT2, respectively. The node between IGTB elements QT1 and QT2 is connected to T-phase terminal TT.

Each of IGBT elements QR1, QR2, QS1, QS2, QT1, and QT2 is driven by drive unit 2. In the normal operation in which commercial AC power supply 5 supplies AC power, each of IGBT elements QR1, QR2, QS1, QS2, QT1, and QT2 is turned on/off at the timing in accordance with the phase of the three-phase AC voltage from commercial AC power supply 5, and this three-phase AC voltage is converted into a DC voltage. At the time of interruption in which commercial AC power supply 5 stops supplying the AC power, IGBT elements QR1, QR2, QS1, QS2, QT1, and QT2 each are fixed in the OFF state, and the operation of converter 40 is stopped.

Capacitor C7 is connected between positive voltage node N1 and negative voltage node N2. The voltage between nodes N1 and N2 is smoothed by capacitor C7.

Power modules MC1 and MC2 constitute a chopper 41. Power module MC1 includes two IGBT elements QC1 and QC 2 connected in series between positive voltage node N1 and negative voltage node N2, and two diodes DC1 and DC2 connected in anti-parallel to IGBT elements QC1 and QC2, respectively. The node between IGTB elements QC1 and QC2 is connected to battery terminal TBP. Negative voltage node N2 is connected to battery terminal TBN.

Power module MC2 includes two IGBT elements QC3 and QC 4 connected in series between positive voltage node N1 and negative voltage node N2, and two diodes DC3 and DC4 connected in anti-parallel to IGBT elements QC3 and QC4, respectively. The node between IGTB elements QC3 and QC4 is connected to battery terminal TBP.

Each of IGBT elements QC1 to QC4 is driven by drive unit 2. In the normal operation in which commercial AC power supply 5 supplies AC power, each of IGBT elements QC1 to QC4 is turned on/off at a prescribed timing, and a part of the DC power generated by converter 10 is supplied to battery 4, to thereby charge battery 4.

At the time of interruption in which commercial AC power supply 5 stops supplying the AC power, each of IGBT elements QC1 to QC4 is turned on/off at the timing different from that in the normal operation, and battery 4 supplies DC power to inverter 12. When the voltage across the terminals of battery 4 is higher than an upper limit voltage or lower than a lower limit voltage, each of IGBT elements QC1 to QC4 is fixed in the OFF state, and the operation of chopper 41 is stopped.

Power modules MU, MV and MW constitute an inverter 42. Power module MU includes two IGBT elements QU1 and QU2 connected in series between positive voltage node N1 and negative voltage node N2, and two diodes DU1 and DU2 connected in anti-parallel to IGBT elements QU1 and QU2, respectively. The node between IGTB elements QU1 and QU2 is connected to U-phase terminal TU.

Power module MV includes two IGBT elements QV1 and QV2 connected in series between positive voltage node N1 and negative voltage node N2, and two diodes DV1 and DV2 connected in anti-parallel to IGBT elements QV1 and QV2, respectively. The node between IGTB elements QV1 and QV2 is connected to V-phase terminal TV.

Power module MW includes two IGBT elements QW1 and QW2 connected in series between positive voltage node N1 and negative voltage node N2, and two diodes DW1 and DW2 connected in anti-parallel to IGBT elements QW1 and QW2, respectively. The node between IGTB elements QW1 and QW2 is connected to W-phase terminal TW.

Each of IGBT elements QU1, QU2, QV1, QV2, QW1, and QW2 is driven by drive unit 2. In the normal operation in which commercial AC power supply 5 supplies AC power, each of IGBT elements QU1, QU2, QV1, QV2, QW1, and QW2 is turned on/off at the timing in accordance with the phase of the three-phase AC voltage from commercial AC power supply 5, and the DC voltage generated by converter 10 is converted into a three-phase AC voltage of a commercial frequency.

At the time of interruption in which commercial AC power supply 5 stops supplying the AC power, each of IGBT elements QU1, QU2, QV1, QV2, QW1, and QW2 is turned on/off at the timing in accordance with the phase of the three-phase AC voltage from commercial AC power supply 5, and the DC voltage supplied from battery 4 is converted into a three-phase AC voltage of a commercial frequency. When the voltage across the terminals of battery 4 is lower than a lower limit voltage, each of IGBT elements QU1, QU2, QV1, QV2, QW1, and QW2 is fixed in the OFF state, and the operation of inverter 42 is stopped.

Figure 6:
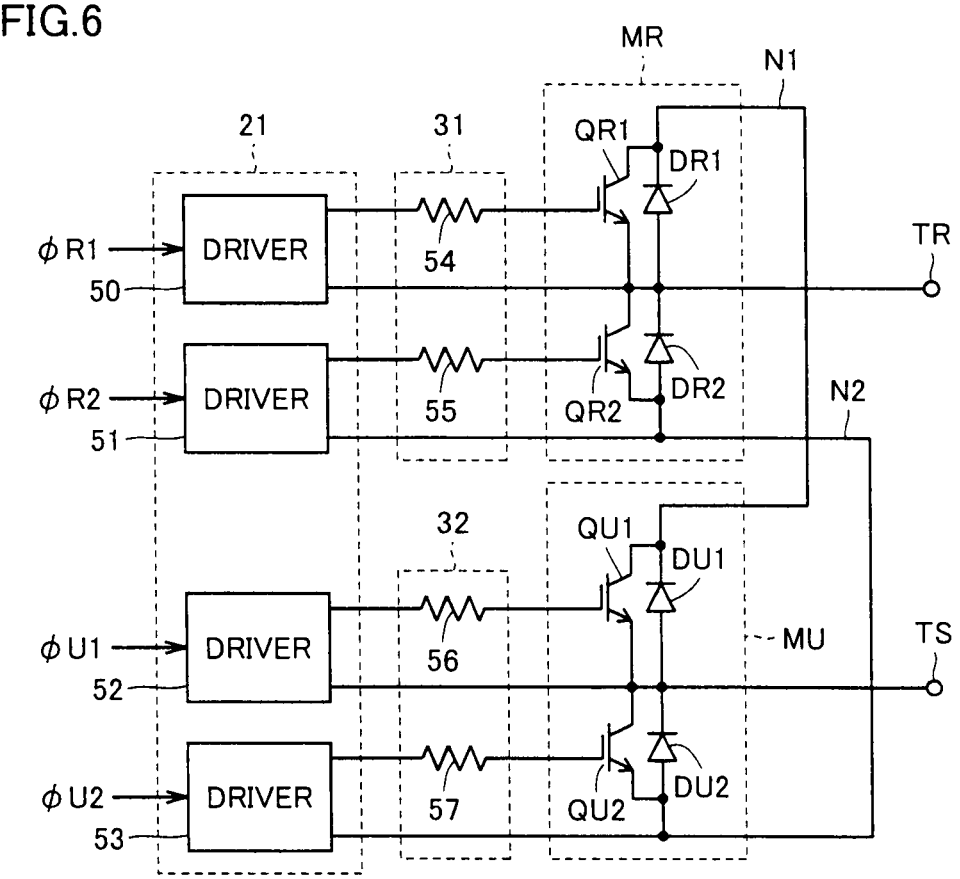
FIG. 6 is a circuit block diagram showing the configuration of a gate drive circuit substrate and a gate resistor shown in FIG. 4.

FIG. 6 is a circuit block diagram showing the configuration of gate drive circuit substrate 21 and gate resistors 31 and 32. In FIG. 6, gate drive circuit substrate 21 includes four drivers 50 to 53, gate resistor 31 includes two resistance elements 54 and 55, and gate resistor 32 includes two resistance elements 56 and 57. Resistance elements 54 to 57 each have one terminal connected to the output nodes of drivers 50 to 53, respectively, and also have the other terminal connected to the gates of IGBT elements QR1, QR2, QU1, and QU2, respectively. Drivers 50 to 53 have their respective reference voltage nodes connected to emitters of IGBT elements QR1, QR2, QU1, and QU2, respectively.

Drivers 50 to 53 output voltages of the levels in accordance with PWM signals ΦR1, ΦR2, ΦU1, and ΦU2, respectively, between their respective output terminals and reference voltage nodes. Each of IGBT elements QR1, QR2, QU1, and QU2 is turned on when a voltage of an "H" level is applied between the gate and the emitter, and is turned off when a voltage of an "L" level is applied between the gate and the emitter. The configuration of gate drive circuit substrate 21, gate resistors 31 and 32 is identical to each of the configuration of gate drive circuit substrate 22, gate resistors 33 and 34; the configuration of gate drive circuit substrate 23, gate resistors 35 and 36; and the configuration of gate drive circuit substrate 24, gate resistors 37 and 38.

Figure 7:
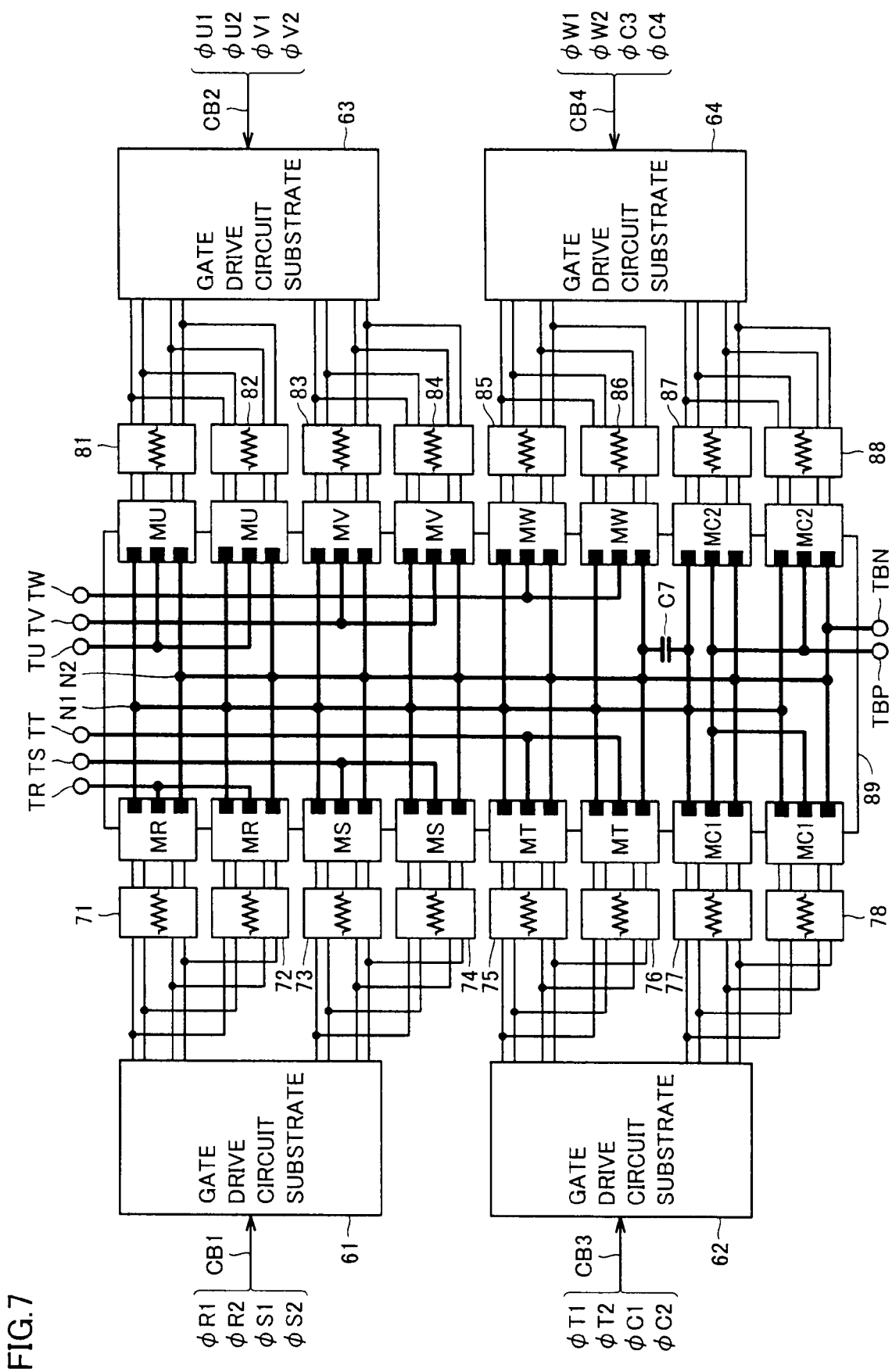
FIG. 7 is a circuit block diagram showing the configuration of the drive unit and the power conversion unit in the case where the uninterruptible power supply device shown in FIG. 1 is of the second type.

FIG. 7 is a block diagram showing the configuration and the layout of drive unit 2 and power conversion unit 3 in the case where the uninterruptible power supply device is of the second type, and shows a diagram compared with FIG. 4. In FIG. 7, since the rated power of the second-type uninterruptible power supply device is approximately twice as much as the rated power of the first-type uninterruptible power supply device, two sets of power modules MR, MU, MS, MV, MT, MW, MC1, and MC2 are used. Furthermore, two sets of power modules MR, MU, MS, MV, MT MW, MC1, and MC2 are arranged in one row, which lengthens the device dimension. Accordingly, two sets of power modules MR, MU, MS, MV MT, MW, MC1, and MC2 are arranged in two rows.

In other words, in the second-type uninterruptible power supply device, drive circuit 2 includes two sets of power modules MR, MU, MS, MV, MT, MW, MC1, and MC2, four gate drive circuit substrates 61 to 64, 16 gate resistors 71 to 78 and 81 to 88, a wiring board 89 of a rectangular shape, and capacitor C7.

Gate drive circuit substrates 61 and 62 are arranged in one row vertically as seen in FIG. 7 on one side of wiring board 89, and connected via their respective four-core cables CB1 and CB3 to output ports 13 and 15, respectively, in FIG. 3. Gate drive circuit substrates 63 and 64 are arranged in one row vertically as seen in FIG. 7 on the other side of wiring board 89, and connected via their respective four-core cables CB2 and CB4 to output ports 14 and 16, respectively, in FIG. 3.

PWM signals ΦR1, ΦR2, ΦS1, and ΦS2 are supplied from PWM circuit 11 via four-core cable CB1 to gate drive circuit substrate 61. PWM signals ΦT1, ΦT2, ΦC1, and ΦC2 are supplied from PWM circuit 11 via four-core cable CB3 to gate drive circuit substrate 62. PWM signals ΦU1, ΦU2, ΦV1, and ΦV2 are supplied from PWM circuit 11 via four-core cable CB2 to gate drive circuit substrate 63. PWM signals ΦW1, ΦW2, ΦC3, and ΦC4 are supplied from PWM circuit 11 via four-core cable CB4 to gate drive circuit substrate 64.

Gate resistors 71 to 78 are arranged in one row adjacent to gate drive circuit substrates 61 and 62. Power modules MR, MR, MS, MS, MT, MT, MC1, and MC1 are adjacent to gate resistors 71 to 78, respectively, arranged in one row along one of the long sides of wiring board 89, and fixed to wiring board 89.

Gate resistors 81 to 88 are arranged in one row adjacent to gate drive circuit substrates 63 and 64. Power modules MU, MU, MV, MV, MW, MW, MC2, and MC2 are adjacent to gate resistors 81 to 88, respectively, arranged in one row along the other of the long sides of wiring board 89, and fixed to wiring board 89.

Each of power modules MR, MU, MS, MV, MT, MW, MC1, and MC2 has the first to third output terminals. The first output terminal of each of power modules MR, MU, MS, MV, MT, MW, MC1, and MC2 is connected to positive voltage node N1. The second output terminals of power modules MR, MU, MS, MV, MT, and MW are connected to R-phase terminal TR, U-phase terminal TU, S-phase terminal TS, V-phase terminal TV, T-phase terminal TT, and W-phase terminal TW, respectively. The second output terminal of each of power modules MC1 and MC2 is connected to battery terminal TBP. The third output terminal of each of power modules MR, MU, MS, MV, MT, MW, MC1, and MC2 is connected to negative voltage node N2 and battery terminal TBN. Capacitor C7 is connected between nodes N1 and N2.

Gate drive circuit substrate 61 drives one power module MR via gate resistor 71 in accordance with PWM signals ΦR1 and ΦR2, and also drives the other power module MR via gate resistor 72 in accordance with PWM signals ΦR1 and ΦR2. Furthermore, gate drive circuit substrate 61 drives one power module MS via gate resistor 73 in accordance with PWM signals ΦS1 and ΦS2, and also drives the other power module MS via gate resistor 74 in accordance with PWM signals ΦS1 and ΦS2.

Gate drive circuit substrate 62 drives one power module MT via gate resistor 75 in accordance with PWM signals ΦT1 and ΦT2, and also drives the other power module MT via gate resistor 76 in accordance with PWM signals ΦT1 and ΦT2. Furthermore, gate drive circuit substrate 62 drives one power module MC1 via gate resistor 77 in accordance with PWM signals ΦC1 and ΦC2, and also drives the other power module MC1 via gate resistor 78 in accordance with PWM signals ΦC1 and ΦC2.

Gate drive circuit substrate 63 drives one power module MU via gate resistor 81 in accordance with PWM signals ΦU1 and ΦU2, and also drives the other power module MU via gate resistor 82 in accordance with PWM signals ΦU1 and ΦU2. Furthermore, gate drive circuit substrate 63 drives one power module MV via gate resistor 83 in accordance with PWM signals ΦV1 and ΦV2, and also drives the other power module MV via gate resistor 84 in accordance with PWM signals ΦV1 and ΦV2.

Gate drive circuit substrate 64 drives one power module MW via gate resistor 85 in accordance with PWM signals ΦW1 and ΦW2, and also drives the other power module MW via gate resistor 86 in accordance with PWM signals ΦW1 and ΦW2. Furthermore, gate drive circuit substrate 64 drives one power module MC2 via gate resistor 87 in accordance with PWM signals ΦC3 and ΦC4, and also drives the other power module MC2 via gate resistor 88 in accordance with PWM signals ΦC3 and ΦC4.

In this embodiment, a plurality of PWM signals generated in PWM circuit 11 are arranged in order in accordance with the type of the uninterruptible power supply device and supplied to a plurality of output terminals, which allows control unit 1 to be shared among a plurality of types of uninterruptible power supply devices. Therefore, the uninterruptible power supply device can be reduced in cost.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 control unit, 2 drive unit, 3 power conversion unit, 4 battery, 5 commercial AC power supply, 6 load, 10 substrate, 11 PWM circuit, 12 switching circuit, 13 to 16 output port, 21 to 24, 61 to 64 gate drive circuit substrate, 31 to 38, 71 to 78, 81 to 88 gate resistor, 39, 89 wiring board, 40 converter, 41 chopper, 42 inverter, 50 to 53 driver, 54 to 57 resistance element, C capacitor, L reactor, T terminal, CB four-core cable, Q IGBT element, D diode.

The invention claimed is:

1. A control device in a power conversion device including a plurality of switching elements, said control device controlling said plurality of switching elements,
- a layout of said plurality of switching elements being different for each type of said power conversion device,
- said control device comprising:
- a signal generation circuit generating a plurality of control signals controlling said plurality of switching elements;
- a plurality of output terminals for supplying said plurality of control signals to said plurality of switching elements; and
- a switching circuit arranging said plurality of control signals in order in accordance with the type of said power conversion device and supplying the plurality of control signals to said plurality of output terminals, wherein
- said plurality of output terminals are grouped by a predetermined number of output terminals into a plurality of first groups, and
- said plurality of switching elements are grouped by said predetermined number of switching elements into a plurality of second groups,
- said control device further comprises:
- a drive circuit provided corresponding to each of the second groups and driving each of the switching elements in a corresponding one of the second groups; and
- a multicore cable connecting said predetermined number of output terminals belonging to each of the first groups and the corresponding drive circuit.

2. The control device according to claim 1, wherein said power conversion device is an uninterruptible power supply device.

* * * * *